United States Patent
Comstock, II et al.

(10) Patent No.: US 9,269,014 B2
(45) Date of Patent: Feb. 23, 2016

(54) HYPERSPECTRAL DETECTOR SYSTEMS AND METHODS USING CONTEXT-IMAGE FUSION

(71) Applicant: Corning Incorporated, Corning, NY (US)

(72) Inventors: Lovell Elgin Comstock, II, Charlestown, NH (US); Leon J Desmarais, Claremont, NH (US); Jeffry John Santman, Keene, NH (US); Peter Gerard Wigley, Corning, NY (US); Patrick W Woodman, Marlborough, NH (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/469,952

(22) Filed: Aug. 27, 2014

(65) Prior Publication Data
US 2015/0086117 A1 Mar. 26, 2015

Related U.S. Application Data

(60) Provisional application No. 61/881,671, filed on Sep. 24, 2013.

(51) Int. Cl.
*G06K 9/46* (2006.01)
*G01J 3/02* (2006.01)
(Continued)

(52) U.S. Cl.
CPC ............... *G06K 9/46* (2013.01); *G01J 3/0289* (2013.01); *G01J 3/2823* (2013.01); *G01J 3/36* (2013.01); *H04N 5/332* (2013.01); *G01J 2003/2826* (2013.01); *G06K 2009/4657* (2013.01); *G06K 2009/4666* (2013.01); *H04N 5/23238* (2013.01)

(58) Field of Classification Search
USPC .......... 382/191, 294, 100, 103, 254; 250/340, 250/342, 353, 338.1; 744/171
See application file for complete search history.

(56) References Cited

U.S. PATENT DOCUMENTS 5,124,915 A   6/1992   Krenzel
5,721,431 A *   2/1998   Hersom et al. ................. 250/342
(Continued)

FOREIGN PATENT DOCUMENTS

EP   326128   8/1989
WO   2011/163624   12/2011   ............. G01N 21/35

OTHER PUBLICATIONS

EP326128—machine translation.
(Continued)

*Primary Examiner* — Anh Do
(74) *Attorney, Agent, or Firm* — Kevin L. Bray

(57) ABSTRACT

The hyperspectral detector systems and methods disclosed herein include capturing a context image and a single-column spectral image that falls within the context image. The context and spectral images are then combined to form a fused image. Using the fused image, the spectral image is panned over the scene and within the context image to capture spectral signatures within the scene. The spectral signatures are compared to reference spectral signatures, and the locations of the one or more spectral signatures within the context image are marked. The systems and methods obviate the need to store and process large amounts of spectral data and allow for real-time display of the fused context image and spectral image, along with the marked locations of matched spectral signatures.

20 Claims, 8 Drawing Sheets

(51) Int. Cl.
 G01J 3/28 (2006.01)
 G01J 3/36 (2006.01)
 H04N 5/33 (2006.01)
 H04N 5/232 (2006.01)

(56) References Cited

U.S. PATENT DOCUMENTS

| | | | | |
|---|---|---|---|---|
| 6,066,850 A | * | 5/2000 | Hersom et al. | 250/342 |
| 7,058,209 B2 | | 6/2006 | Chen et al. | 382/117 |
| 8,094,960 B2 | * | 1/2012 | Riley et al. | 382/254 |
| 8,213,011 B2 | | 7/2012 | Farsaie et al. | 356/416 |
| 8,260,086 B2 | * | 9/2012 | Riley et al. | 382/294 |
| 2008/0297587 A1 | | 12/2008 | Kurtz et al. | |
| 2010/0013927 A1 | | 1/2010 | Nixon | |
| 2012/0140981 A1 | | 6/2012 | Berkman et al. | 250/339.07 |

OTHER PUBLICATIONS

International Search Report, issued in connection with corresponding PCT application No. PCT/US2014/056270, Sep. 18, 2014.

Healey G. et al.: "Face recognition in hyperspectral images", IEEE Transactions on Pattern Analysis and Machine Intelligence, IEEE Computer Society, USA, vol. 25. No. 12, (2003 ), pp. 1552-1560.

Lagueux et al., "Chemical Agent Standoff Detection and Identification with a Hyperspectral Imaging Infrared Sensor", Proc. of SPIE, vol. 7486, pp. 74860C-1-74860C-12. 2009.

\* cited by examiner

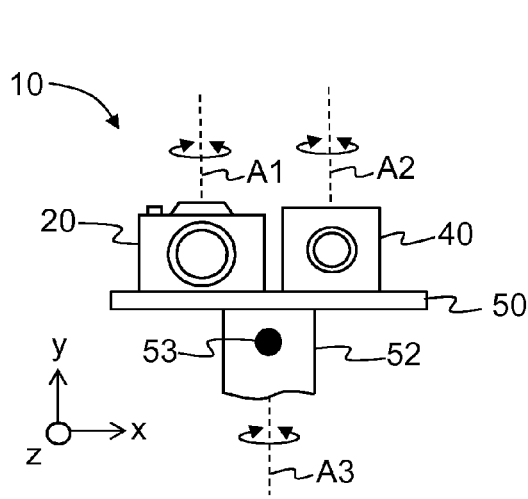
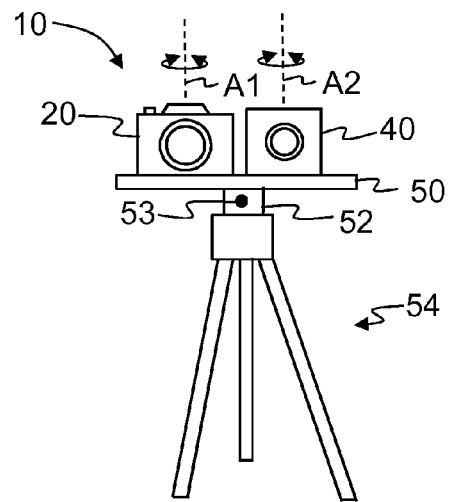
FIG. 3A  FIG. 3B
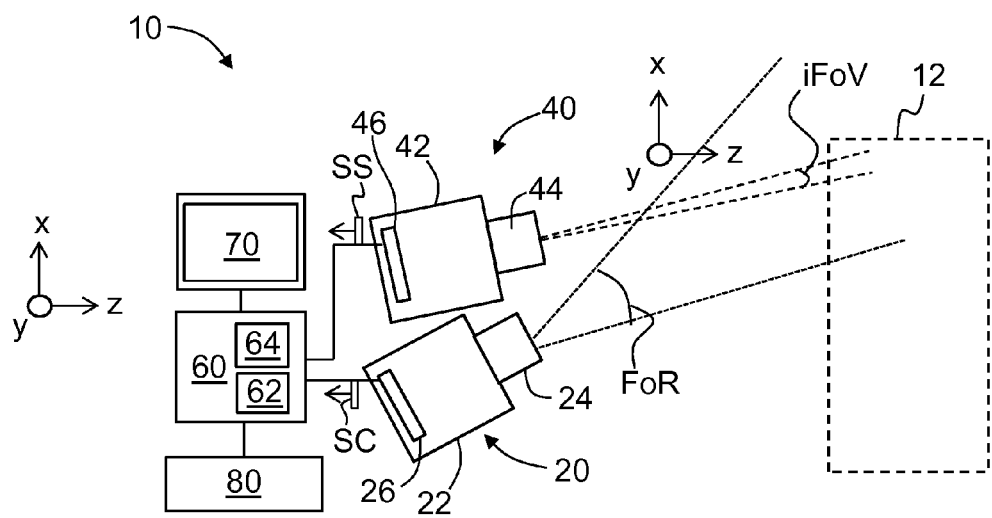
FIG. 4A

HYPERSPECTRAL DETECTOR SYSTEMS AND METHODS USING CONTEXT-IMAGE FUSION

This application claims the benefit of priority under 35 U.S.C. §119 of U.S. Provisional Application Ser. No. 61/881,671 filed on Sep. 24, 2013 the content of which is relied upon and incorporated herein by reference in its entirety.

FIELD

The present disclosure relates to hyperspectral imaging, and in particular relates to hyperspectral detector systems and methods that use context-image fusion.

The entire disclosure of any publication or patent document mentioned herein is incorporated by reference.

BACKGROUND

Hyperspectral imaging involves imaging multiple (e.g., dozens or hundreds of) narrow spectral bands over a spectral range to produce a composite image wherein each pixel in the scene being captured includes contiguous spectral data of the scene. An aspect of hyperspectral imaging combines a conventional two-dimensional (2D) spatial image with a third dimension of contiguous spectral bands, essentially performing spectrometry on each individual pixel of the 2D spatial image.

Conventional hyperspectral imaging involves generating a hyper-cube of data for the scene being imaged. A hyper-cube is in essence a three-dimensional (3D) image, where two of the dimensions are spatial and one dimension is contiguous spectral data. Depending on the device used to generate the data, the acquisition time for a single hyper-cube image from most hyperspectral systems can be on the order of tens of seconds before useful context-sensitive information can be extracted.

Due to the 3D nature of the data, hyper-cubes can be quite large, with their size depending on the spatial and spectral resolution of the image. While this amount of data collection is necessary for many hyperspectral applications, it is not necessary for all of them. In spectral detection applications, more often than not, the vast majority of the data collected is not needed.

One type of hyperspectral imaging system looks for specific pre-determined spectral signatures in a given area and is called a hyperspectral detector or HSD. In essence, HSDs are "Go/No-Go" sensors that verify the presence or absence of the particular spectral signatures that cannot be readily detected by visual methods or other means. It is often preferred that the information from the HSD be available in real-time so that users can take action in real-time rather than having to wait for the computation to be completed. Furthermore, for mobile or hand-held HSDs, computing power of the HSD may be limited.

SUMMARY

An aspect of the disclosure is a method of performing hyperspectral detection of a scene. The method includes: capturing a digital context image of at least a portion of the scene over a field of regard; capturing a spectral image of the scene over an instantaneous field of view that falls within the field of regard, and wherein the instantaneous field of view is less than half of the field of regard; fusing the context image and the spectral image to form a fused image; panning the spectral image over the scene and within the field of regard to capture one or more spectral signatures within the scene; and comparing the one or more spectral signatures to one or more reference spectral signatures and marking one or more locations of the one or more spectral signatures within the context image.

Another aspect of the disclosure is a method of performing hyperspectral detection of a scene. The method includes capturing a digital context image of at least a portion of the scene over a field of regard; capturing a spectral image of the scene over an instantaneous field of view with a single column of pixels of a first sensor, wherein the instantaneous field of view falls within the field of regard; fusing the context image and the spectral image to form a fused image; panning the spectral image over the scene to capture one or more spectral signatures within the scene; comparing the one or more spectral signatures to one or more reference spectral signatures and marking one or more locations of the one or more spectral signatures within the context image; and displaying on a display in real-time the fused image and the one or more marked locations.

Another aspect of the disclosure is a hyperspectral detection system for spectrally analyzing a scene. The system includes a context camera operably arranged to capture a digital context image of at least a portion of the scene over a field of regard. The system also includes an imaging spectrometer operably arranged to capture a spectral image of the scene over an instantaneous field of view that falls within the field of regard and that is less than half of the field of regard. The system also includes means for panning the spectral image over the scene and within the field of regard to capture one or more spectral signatures within the scene. The system further includes a processor that receives and fuses the context image and the spectral image to form a fused image. The processor is configured to compare the one or more spectral signatures to one or more reference spectral signatures and to mark one or more locations of the one or more spectral signatures within the context image.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which:

FIG. 3A is a front-on view of an example hyperspectral detection system that shows the context camera and the imaging spectrometer supported by a support member;

FIG. 3B shows the example hyperspectral detection system supported by a support device shown as a tripod by way of example;

FIGS. 4A through 4C are similar to FIG. 1 and show an example of how the hyperspectral detector system disclosed herein can be used to analyze the scene of FIG. 2;

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

The entire disclosure of any publication or patent document mentioned herein is incorporated by reference.

Cartesian coordinates are shown in some of the Figures for the sake of reference and are not intended to be limiting as to direction or orientation.

Figure 1:
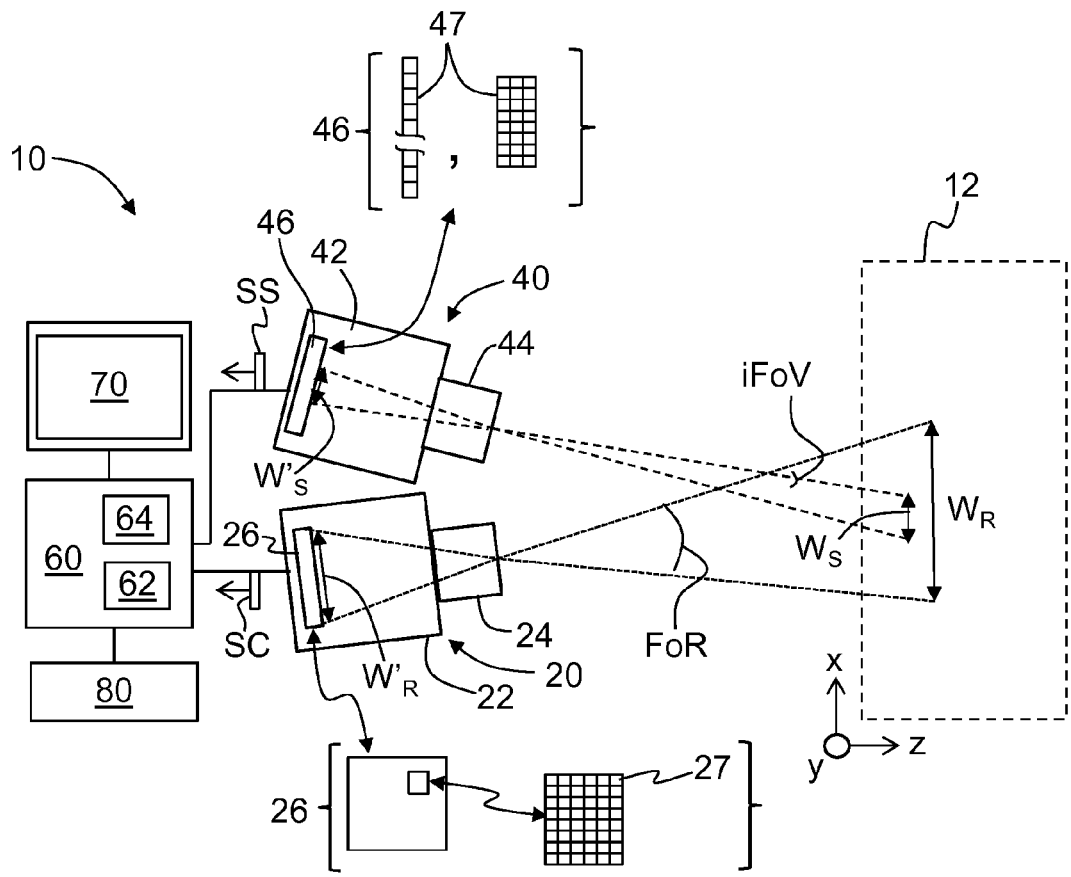
FIG. 1 is a schematic diagram of an example hyperspectral detection system according to the disclosure.
Figure 2:
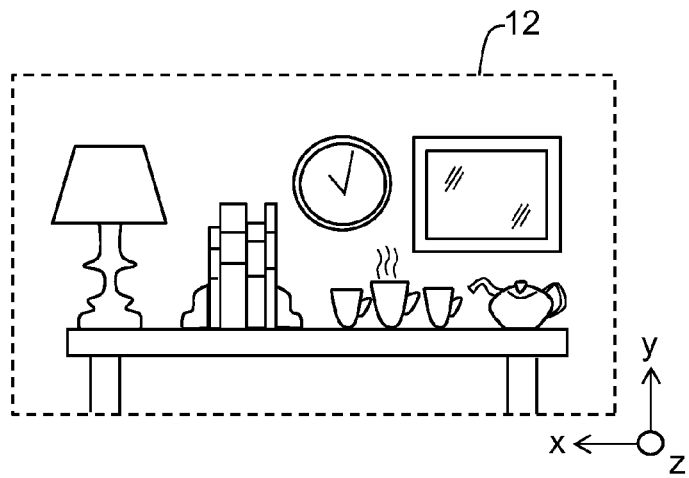
FIG. 2 is a front-on view of an example scene to be analyzed by the hyperspectral detector system of FIG. 1.

FIG. 1 is a schematic diagram of an example hyperspectral detection (HSD) system 10 according to the disclosure. The HSD system 10 is shown arranged relative to a scene 12 to be spectrally analyzed, which is discussed in greater detail below. Cartesian coordinates are shown for the sake of reference. FIG. 2 is a front-on view of an example scene 12, i.e., looking in the z-direction.

The HSD system 10 includes a context camera 20 that includes a housing 22 that operably supports a context-camera lens 24 and an image sensor 26. In an example, context camera 20 is a conventional visible-wavelength digital camera, while in another example the context camera is an infrared (IR)-wavelength camera or a combination of a visible (VIS) and near-IR (NIR) camera (e.g., VIS and/or near-IR (NIR) and/or short-wavelength IR (SWIR) and/or mid-wavelength IR (MWIR) and/or long-wavelength IR (LWIR)). In an example, lens 24 has zoom capability. In an example embodiment, context camera 20 is image-stabilized using one or more image-stabilization techniques known in the art. Also in an example embodiment, lens 24 includes autofocusing capability using one or more autofocusing techniques known in the art.

In an example, image sensor 26 comprises an array of pixels 27 (see corresponding close-up inset) wherein the pixel array has a size of equal to or greater than 1,280×1,024 pixels. In an example, pixels 27 have a width $W_{27}$ in the range from 3 μm to 5 μm. In an example, context camera 20 is a cellphone camera, a tablet camera or a smartphone camera.

The context camera 20 has a field of view that is referred to herein as a "field of regard" FoR. The context camera 20 captures a digital context image of a portion of scene 12 over the field of regard FoR and generates in response a digital context-image signal SC. The digital context image is a generally recognizable 2D spatial image that provides spatial (visual) context of at least a portion of scene 12.

The HSD system 10 also includes an imaging spectrometer 40 that in an example includes a housing 42 that operably supports an imaging lens 44 and an image sensor 46 having pixels 47 (see corresponding close-up inset). In an example, pixels 47 have a width $W_{47}$ in the range from 10 μm to 25 μm (e.g., from about 2× to about 8× the size of pixels 27). In an example, sensor 46 has multiple rows and columns of pixels 27 that allows for spectral imaging over a portion (i.e., a sub-region) of the digital context image. In an example, imaging lens 44 has zoom capability. In an example, imaging spectrometer 40 is dispersion-based. In an example, sensor 46 is capable of analyzing 512 spatial pixels 47×80 spectral pixels, with a size of 15 microns/pixel, and a spectral range of 0.9 μm to 1.7 μm at 10 nm (spectral)/pixel. In an example embodiment, imaging spectrometer 40 is compact, e.g., has a volume of less than about 12 cubic inches, to facilitate portability of HSD system 10. In an example embodiment, imaging spectrometer 40 is image-stabilized using one or more image-stabilization techniques known in the art. Also in an example embodiment, lens 44 includes autofocusing capability using one or more autofocusing techniques known in the art.

The imaging spectrometer 40 has an instantaneous field of view iFoV that is substantially narrower than a field of regard FoR of context camera 20. FIG. 1 shows a width $W_S$ of the spectrometer instantaneous field of view iFOV in scene 12, along with the corresponding width $W'_S$ of the corresponding spectrometer (spectral) image formed at image sensor 46. FIG. 1 also shows a width $W_R$ of the field of regard FoR in scene 12, as well as the corresponding width $W'_R$ of the corresponding context-camera image formed at image sensor 26. The widths $W_S$ and $W'_S$ are related by the magnification $M_{44}$ of imaging lens 44, i.e., $W'_S = M_{44} \cdot W_S$. Likewise, the widths $W_R$ and $W'_R$ are related by the magnification $M_{24}$ of imaging lens 24, i.e., $W'_R = M_{24} \cdot W_R$. In the case where $M_{44} = M_{24}$, it follows that $W'_S/W'_R = W_S/W_R$.

The imaging spectrometer 40 captures a digital spectral image of a narrow portion of scene 12 over the instantaneous field of view iFoV and generates in response a digital spectral-image signal SS that includes one spatial dimension (e.g., a column of pixels) and one spectral dimension (i.e., the spectral data for each pixel in the column of pixels). In example embodiments, imaging spectrometer 40 operates over one or more of the visible and IR wavelengths, e.g., one or more of VIS, NIR, SWIR, MWIR and LWIR.

The instantaneous field of view iFoV is substantially narrower than field of regard FoR. In an example, the instantaneous field of view iFoV is less than half of the field of regard FoR. The width $W'_S$ of the spectral image is define by the number $N_{C47}$ of columns of pixels 47 multiplied by the width $W_{47}$ of a single pixel 47 of sensor 46, i.e., $W'_S = (N_{C47}) \cdot (W_{47})$. The minimum width of $W'_S$ is when $N_{C47}=1$, i.e., $W'_S = W_{47}$. Likewise, the width $W'_R$ of the context image is defined by the number $N_{C27}$ of columns of pixels 27 multiplied by the width $W_{27}$ of a single pixel 27 of sensor 26, i.e., $W'_R = (N_{C27}) \cdot (W_{27})$. Note that the minimum value of the ratio $W'_S/W'_R$ (and thus the minimum value of $W_S/W_R$) is $W_{47}/W_R$.

In various examples, $W_{47}/W'_R \leq [W'_S/W'_R] < 0.5$ or $W_{47}/W'_R \leq [W'_S/W'_R] < 0.25$ or $W_{47}/W'_R \leq [W'_S/W'_R] < 0.15$ or $W_{47}/W'_R \leq [W'_S/W'_R] < 0.10$ or $W_{47}/W'_R \leq [W'_S/W'_R] < 0.5$ or $W_{47}/$ $W_R \le [W'_S/W'_R] < 0.1$ or $W_{47}/W'_R \le [W'_S/W'_R] < 0.05$ or $W_{47}/W'_R \le [W'_S/W'_R] < 0.1$. In an example embodiment, instantaneous field of view iFoV is defined by a single column of pixels 47 of image sensor 46, so that $W'_S/W'_R = W_{47}/W'_R$. In other example embodiments, instantaneous field of view iFoV is defined by a portion of the available row and column pixels 47 of image sensor 46.

FIG. 3A is a front-on view of an example configuration of HSD system 10 wherein context camera 20 and imaging spectrometer 40 are operably supported by a support member 50 so that each can rotate about respective axes A1 and A2 shown oriented in the y-direction. Also in an example, support member 50 is rotatable about an axis A3 oriented in the same direction as axes A1 and A2. In an example, support member 50 is attached to or includes a post 52 to facilitate rotation about axis A3. In an example, post 52 is sized and otherwise configured to be hand-held (e.g., to have a hand grip) so that that HSD system 10 can be hand-held by a user (see FIGS. 7A through 7C, introduced and discussed below). Thus, in an example, post 52 defines a handle.

In another example illustrated in FIG. 3B, post 52 is used to mount HSD system 10 to a support device 54, such as a gimbaled device or a tripod (as shown). In an example, post 52 includes a switch 53 that can be used to activate HSD system 10, e.g., to capture a context image 100 and/or a spectral image 110 (see FIG. 5A), to provide input to a computer, etc.

The support device 54 serves to facilitate the relative alignment of context camera 20 and imaging spectrometer 40 so that select pixels of context-camera image sensor 26 are co-located with pixels 47 of imaging-spectrometer sensor 46.

With reference again to FIG. 1, HSD system 10 also includes a computer 60 operably connected to context camera 20 and imaging spectrometer 40. The computer 60 is configured to receive context-image signals SC and spectral-image signals SS and to process these signals (and, when needed, to fuse spectral image 110 with context image 100) to perform context-based hyperspectral detection, as described in greater detail below. The HSD system 10 also includes a display 70 operably connected to computer 60. The display 70 can be used to display context image 100, spectral image 110 or both images to together when viewing at least a portion of scene 12, as discussed below. In an example, display 70 has touch-screen capability that can be used to control computer 60.

The computer 60 includes a processor 62 and a memory unit ("memory") 64. In an example, memory 64 includes stored spectral data (reference spectral data) to which the measured spectra can be compared.

The computer 60 is configured to execute instructions stored in firmware and/or software to process spectral-image signals SS and context-image signals SC. The computer 60 is programmable to perform the functions described herein, including the operation of HSD system 10 and the aforementioned signal processing of spectral-image signals SS and context-image signals SC. As used herein, the term "computer" is not limited to just those integrated circuits referred to in the art as computers but broadly refers to computers, processors, microcontrollers, microcomputers, programmable logic controllers, application-specific integrated circuits and other programmable circuits, and these terms are used interchangeably herein.

Software in the form of instructions embodied in a computer-readable medium may implement or aid in the performance of the operations of HSD system 10 disclosed herein, including the aforementioned signal processing. The software may be operably installed in computer 60 and in particular in processor 62 and memory 64. Software functionalities may involve programming, including executable code, and such functionalities may be used to implement the methods disclosed herein. Such software code is executable by the general-purpose computer, e.g., by processor 62.

In an example, the software causes processor 62 to fuse or otherwise combine a 2D context image 100 with a 1D spectral image 110. In particular, the pixels of context-camera image sensor 26 and imaging-spectrometer sensor 46 can be given respective grid coordinates that the software can use to process context image 100 and spectral image 110. For example, the pixels of context-camera image sensor 26 can be given grid coordinates C1H through C1280H by (x) C1V through C1,024V, and the imaging-spectrometer sensor 46 can be given coordinates S1V through S512V (where V=vertical, H=horizontal). The imaging spectrometer 40 and context camera 20 are aligned so that the context-camera image-sensor pixels C1V×C640H and C2V×C640H are co-located with spectrometer pixel row S1V, and C1023V×C640H and C1024V×C640H are co-located with spectrometer pixel row S512V.

In operation, the code and possibly the associated data records are stored within a general-purpose computer platform within processor 62 and/or in memory 64. At other times, however, the software may be stored at other locations and/or transported for loading into the appropriate general-purpose computer systems. Hence, the embodiments discussed herein can involve one or more software products in the form of one or more modules of code carried by at least one machine-readable medium. Execution of such code by processor 62 of computer 60 enables the platform to implement the catalog and/or software downloading functions in essentially the manner performed in the embodiments discussed and illustrated herein.

The computer 60 and/or processor 62 may each employ a computer-readable medium or machine-readable medium (e.g., memory 64), which refers to any medium that participates in providing instructions to the processor for execution, including, for example, determining the spectral content of select items in scene 12, as discussed in greater detail below. The memory 64 constitutes a computer-readable medium. Such a medium may take many forms, including but not limited to non-volatile media, volatile media and transmission media. Non-volatile media include, for example, optical or magnetic disks, such as any of the storage devices in any computer(s) operating as one of the server platforms discussed above. Volatile media include dynamic memory, such as the main memory of such a computer platform. Physical transmission media include coaxial cables, copper wire and fiber optics, including the wires that comprise a bus within a computer system.

In an example, computer 60 includes input means (e.g., the aforementioned touch-screen capability for display 70) such as a keyboard, buttons, etc. (see buttons 210, FIG. 7C, which is introduced and discussed below) that allow a user to provide input to the computer. Example inputs to HSD system 10 via computer 60 include software control settings such as image acquisition speed or shutter speed, selection of spectral data stored in memory 64 (e.g., selection from a spectral library), on/off selection for recording a context image and/or a spectral image, and on/off selection for illumination (not shown).

In an example embodiment, HSD system 10 includes a power supply 80, such as a battery pack, so that the HSD system can be portable.

Examples of how spectral-image signals SS and context-image signals SC are processed are described in greater detail below. The HSD system 10 is operable to capture still images as well as video images.

The HSD system 10 can have other components that are not shown that provide additional functionality and information, such as GPS coordinates, geographic-information-system (GIS) data, compass heading, inclinometer heading, etc. As noted above, these devices/functions may also reside in computer 60 or other parts of HSD system 10.

In an example, computer 60 is contained in context camera 20, e.g., as processor 62 and memory 64 therein. For example, in the case where context camera 20 comprises a smartphone camera or a tablet camera, computer 60 can include the smartphone computing elements and the functionality of these devices, such as those mentioned immediately above (see FIG. 9, introduced and discussed below).

In conventional HSD systems, the spectral image data is captured by a stationary sensor platform that systematically step-scans a small instantaneous field of view (iFoV) (e.g., a single column of pixels) over the much wider field of regard (FoR). The duration of the scan can be from one to tens of seconds, depending on the particular application, the conditions, and the nature of the scene being analyzed. The spectrometer sensor and the scene must remain stationary and undisturbed relative to each other for the duration of the scan to capture coherent, accurate spatial context information, which is usually not available until the scan is complete.

The HSD system 10 operates in a simpler and more efficient manner. Rather than collecting all the spectral data for each pixel 47 of imaging-spectrometer sensor 46 for scene 12, spectral data is collected for only a small region of the scene, e.g., a single column of pixels 47 or a small number of columns of pixels 47, wherein, in an example, the number of pixel columns is defined by the user. The spectral data for the small region of scene 12 is then displayed as a spectral image 110 in real-time along with context image 100, i.e., the spectral image is fused with the context image and displayed on display 70.

Figure 4B:
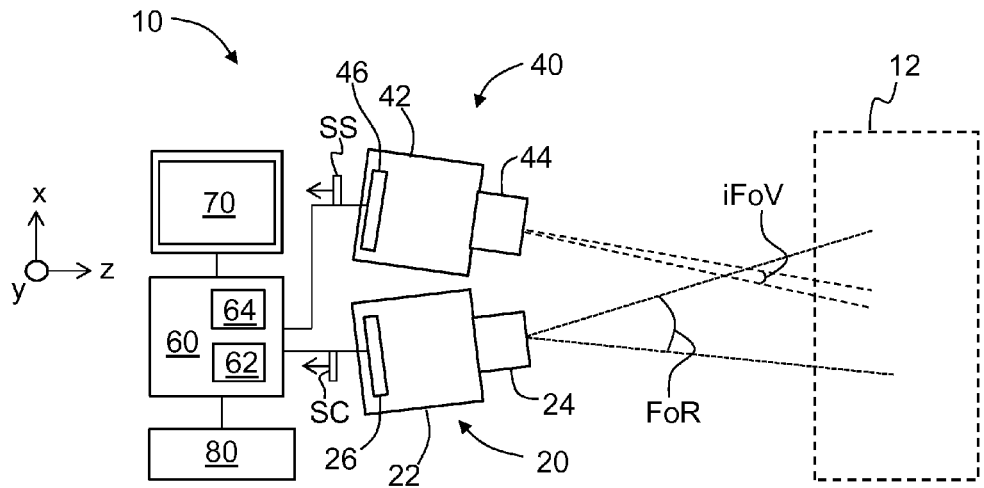
Figure 4C:
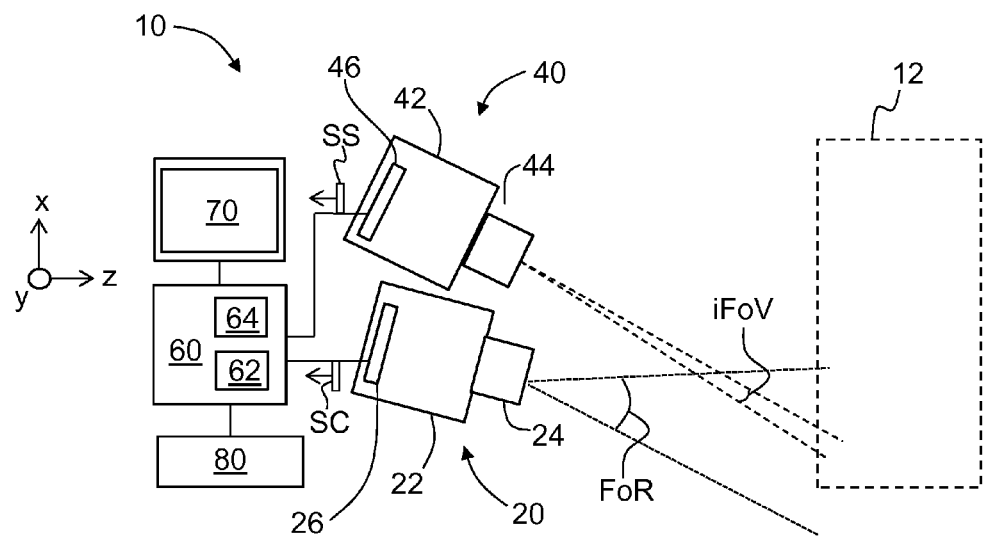

FIGS. 4A through 4C are similar to FIG. 1 and show an example of how HSD system 10 can be used to analyze scene 12. FIG. 4A shows context-camera field of regard FoR being directed to the "+x" end of scene 12. In this position, context camera 20 captures a context image of an end portion of scene 12. The imaging spectrometer is arranged (e.g., rotated) so that its instantaneous field of view iFoV is roughly in the center of field of regard FoR at the location of scene 12. Other positions of instantaneous field of view iFoV are possible, and a center position is shown as one convenient example position.

FIGS. 4B and 4C show context camera 20 and imaging spectrometer 40 being scanned together over scene 12, with FIG. 4B showing the center of the scene being analyzed, and FIG. 4C showing the "−x" end of the scene being analyzed. Note that by scanning context camera 20 and imaging spectrometer 40 together, instantaneous field of view iFoV maintains its position within field of regard FoR. However, context camera 20 and imaging spectrometer 40 need not be scanned together in this manner. In an example, the relative position of instantaneous field of view iFoV can change within field of regard FoR, e.g., by moving (rotating) imaging spectrometer 40 at a different rate than context camera 20. In another example, context camera 20 can be fixed and imaging spectrometer 40 moved (e.g., rotated) to scan over some or all of field of regard FoR.

In examples, the scanning of scene 12 by context camera 20 and imaging spectrometer 40 can be performed manually or automatically, e.g., under the control of computer 60. Because context camera 20 is used, it is not necessary to wait for imaging spectrometer 40 to complete an entire scan of field of regard FoR before presenting useable data (spectral recognition fused with spatial context) to the user, e.g., via display 70. Because the feedback is in real-time (e.g., >15 frames/second), the user has the ability to position instantaneous field of view iFoV anywhere within field of regard FoR, and can also change the position of the field of regard relative to scene 12. The user can start and stop anywhere in scene 12 and can instantly reposition anywhere within the scene, including looking into "blind-spots" or otherwise inaccessible areas.

Figure 5A:
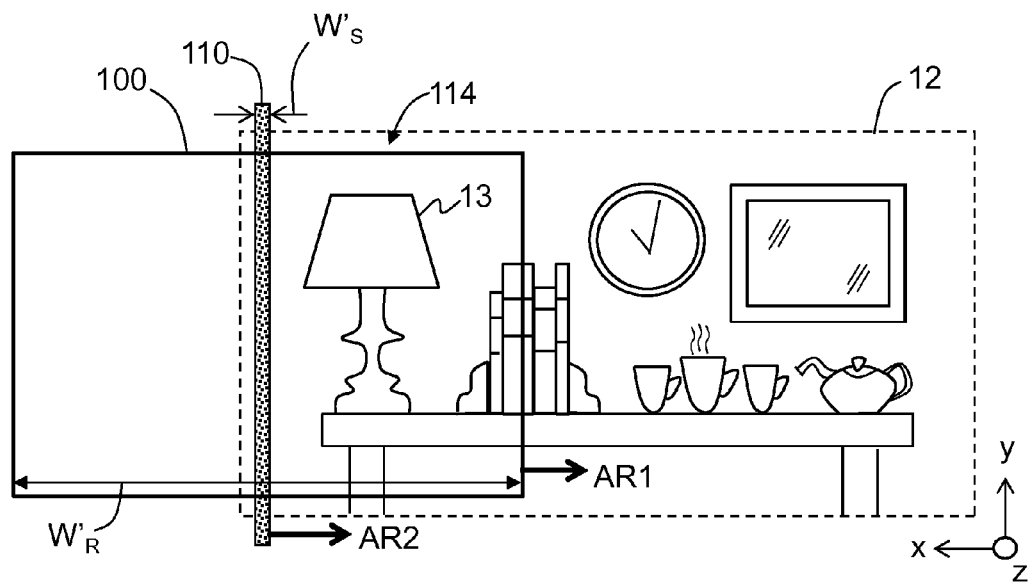
FIGS. 5A through 5C correspond to FIGS. 4A through 4C, respectively, and show the scene of FIG. 2 as viewed by the hyperspectral detection system as the scene is panned.
Figure 5B:
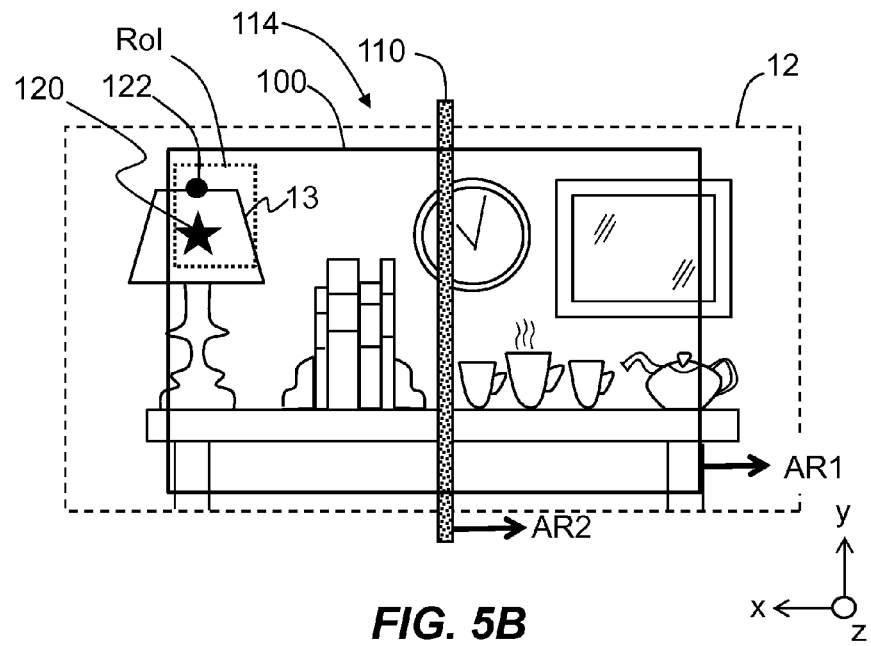
Figure 5C:
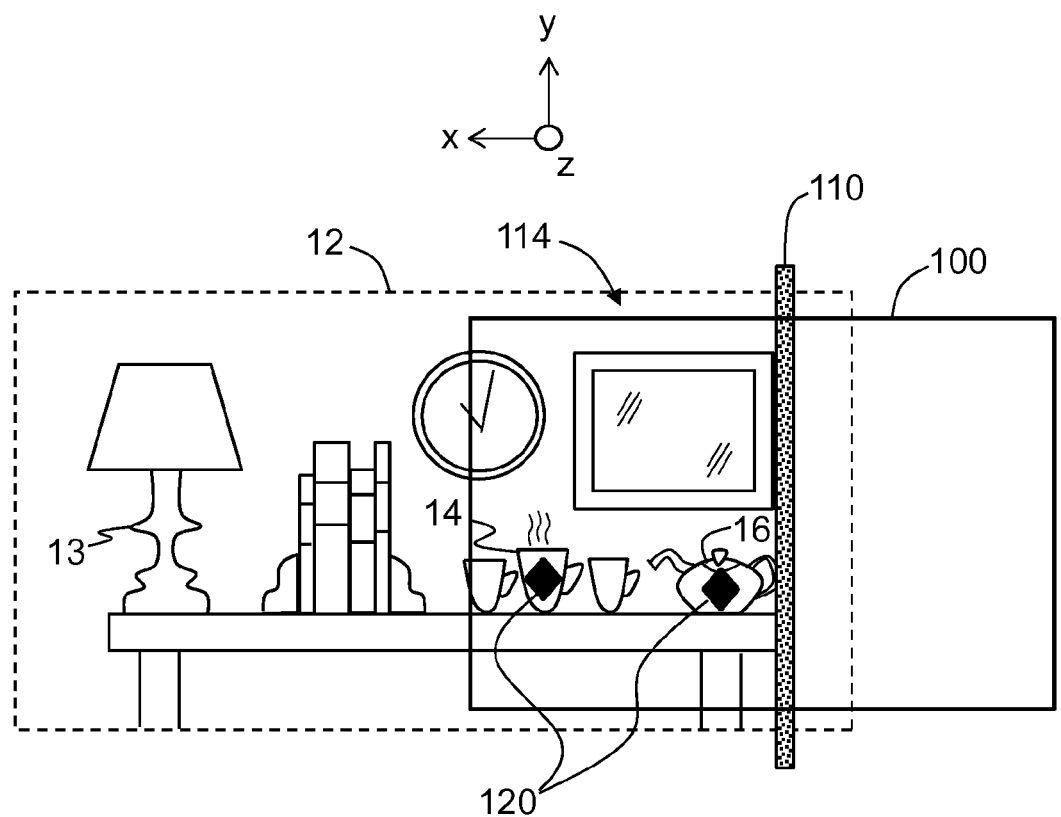

FIGS. 5A through 5C correspond to FIGS. 4A through 4C, respectively, and show scene 12 as viewed by HSD system 10. FIGS. 5A through 5C each includes a context-camera image 100 defined by field of regard FoR and the corresponding spectral image 110 in the form of a vertical stripe superimposed with the corresponding context-camera image. The spectral image 110 is stippled for clarity and represents the hyperspectrally sensitive portion of scene 12. The combination of context image 100 and spectral image 110 defines a fused image 114.

FIG. 5A shows fused image 114 at the +x side of scene 12. This represents the initial position of HSD system 10 for scanning and analyzing scene 12. FIG. 5A also shows the width $W'_R$ of context image 100 and the width $W'_S$ of spectral image 110. Note how in FIG. 5A context image 100 covers only an end portion of scene 12, and how spectral image 110 only covers a portion of context image 100 at the left edge of the scene.

In an example of the operation of HSD system 10, the system is powered up and initialized. This can include initializing context camera 20, including initiating automated adjustment of the focus and light intensity levels. The initialization process can also include initializing imaging spectrometer 40, including initiating the automated adjustment of focus and light intensity levels and performing a spectral calibration.

Once the initialization is completed, the user can direct HSD system 10 toward a select portion (e.g., a target area) of scene 12. The user can then position spectral image 110 within context image 100, i.e., within field of regard FoR, to define the configuration of fused image 114. As noted above, FIG. 5A represents an example initial position of context image 100 and spectral image 110 for fused image 114 relative to scene 12.

At this point, the user activates imaging spectrometer 40 (e.g., via switch 53) and moves context camera 20 and the imaging spectrometer (e.g., in synchrony) to pan scene 12 to identify spectral signatures of interest, e.g., by comparing detected spectra to reference spectra stored in memory 64. The movement (scanning) of fused image 114 is indicated by arrows AR1 and AR2 that show the movement of context image 100 and spectral image 110.

FIG. 5B shows context image 100 and spectral image 110 after having scanned over the left-half of scene 12 so that the context image and the spectral image are about centered in the scene. A tag 120 has been placed on a lamp 13, which contains an incandescent bulb (not shown) that burns hot and thus has a strong spectral signal over the IR spectrum that matches a stored spectral signature in the spectral library maintained in memory 64. The tag 120 serves to mark the position of the spectral signature within context image 100.

If a spectral signature of interest (i.e., a spectral match) is found during the scanning of fused image 114, then the corresponding area of context image 100 is identified as a region of interest RoI, as shown as a dotted-line box in FIG. 5B. For example, the corresponding context-image pixels 27 are highlighted and the spatial, color and intensity geometry of the surrounding context-image pixels are highlighted e.g., to define region of interest RoI on context-camera display 70. The region of interest RoI can be tracked while it remains within field of regard FoR.

As context camera 20 and imaging spectrometer 40 continue to move and scan fused image 114 over scene 12, tag 120 remains in place. Moreover, context image 100 is updated with new tags to mark new spectral matches as they are identified. FIG. 5C shows fused image 114 at the right side of scene 12 after having scanned the scene. Two new spectral signatures associated with a tea cup 14 and a teapot 16 are each identified and marked with respective tags 120. Note that the two new tags 120 are black diamonds, which represent a different spectral signature than the star tag 120 that identifies the spectral signature associated with lamp 13.

In an example embodiment, spectral matches are continuously tracked and the associated pixels 27 of context image 100 highlighted while they remain within field of regard FoR. For example, a spectral-match tag 120 at lamp 13 can be used to indicate a spectrally matching fingerprint on the lamp.

The result of the scan of scene 12 as performed by HSD system 10 is spectral identification information (and optionally geometry-tracking information) about the scene. The information can be embodied in one or more still images or in a video image.

At this point, the user can display a still version or video version of fused image 114 complete with spectral tags 120 and optionally with geometry tags 122. The user also can relocate within scene 12 from a different perspective, angle or distance, can return to earlier scanned portions of the scene to rescan and/or can relocate to another scene within field of regard FoR.

The type of scanning performed by HSD system 10 is not the same as, and nor should it be confused with, the so-called "push-broom" hyperspectral imaging method. The pushbroom method generates a continuous 2D spatial×1D spectral hyper-cube of the scene line by line (similar to a strip-chart) by scanning in one direction across the scene. While the scanning method disclosed herein requires moving context camera 20 and imaging spectrometer 40 relative to scene 12 to spatially and contextually locate a spectrally matching region within the scene, it is not necessary to move across the entire scene, nor in any pre-determined fashion, to acquire and display contextually useful data to the user.

As noted above, conventional hyperspectral imaging performs spectral analysis on each and every pixel of the imaging spectrometer within a given 2D image. A 3D hyper-cube of data is generated for each image, with two spatial dimensions and one spectral dimension. As an example of conventional hyperspectral imaging, for a moderate-resolution image, there could be 640×480 spatial increments (pixels) and 100 spectral increments (bands), for a total of 30,720,000 data points. After capture and storage of that data cube (approximately 20 seconds @ 30 camera frames/second), contextual analysis of the scene by the user can begin.

The HSD system 10 and associated methods disclosed herein obviate the need for generating the second (horizontal) spatial dimension to access contextually usable data. Using the above hyper-cube resolution as a baseline, the elimination of the generation of the second spatial dimension has at least the following advantages. First, it reduces the number of data points required for contextual analysis from 30,720,000 to 48,000, which is a 640× improvement. Second, it reduces the time required for the user to gain access to contextually useful information from >20 seconds to <0.03 seconds, which represents a 600× improvement. Third, it reduces the complexity and increases the compactness of HSD system 10, to the point where the HSD system can be hand-held.

Figure 6:
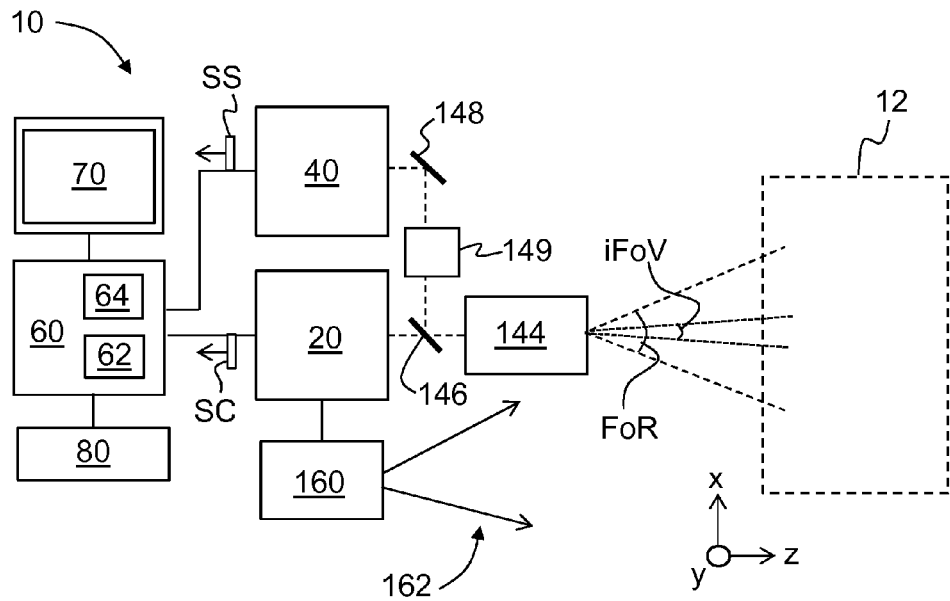
FIG. 6 illustrates an example embodiment of the hyperspectral detection system wherein the imaging lenses for the context camera and the imaging spectrometer are replaced with a single lens.

FIG. 6 illustrates an example embodiment of HSD system 10 wherein imaging lenses 24 and 44 for context camera 20 and imaging spectrometer 40, respectively, are replaced with a single lens 144 that is used for both the context camera and the imaging spectrometer. This allows for context image 100 and spectral image 110 to be captured using a common (i.e., the same) lens. In the example shown, a dichroic mirror 146 and a regular mirror 148 are employed to direct light from scene 12 to imaging spectrometer 40. In another example embodiment, additional optical components 149 in the form of lenses, one or more aperture stops, etc., are positioned between lens 144 and either context camera 20 or imaging spectrometer 40 (as shown, by way of example) to correct for imaging at the different wavelengths and to otherwise define the imaging optics for the context camera or the imaging spectrometer. The embodiment of FIG. 6 allows for a single light-collection optical system in the form of lens 144, which simplifies HSD system 10. In an example, lens 144 has zoom capability. In an example, lens 144 is image-stabilized using one or more image-stabilization techniques known in the art. Also in an example embodiment, lens 144 includes autofocusing capability using one or more autofocusing techniques known in the art.

FIG. 6 also illustrates an example embodiment of HSD system 10 that includes an illumination source 160 for illuminating at least a portion of scene 12 with illumination light 162. The light 162 may be selected to have wavelengths specifically intended for use by imaging spectrometer 40 or by context camera 20, or both.

If active illumination by illumination source 160 is necessary or desirable, only the narrow region being spectrally scanned needs to be stably illuminated, and only for the duration of a camera frame. The entire scene 12 need not be illuminated for the entire scan of the scene. This results in a significant gain in illumination intensity (based on area reduction and/or pulse duration) for the same illumination source, resulting in a corresponding increase in the signal-to-noise ratio and system sensitivity.

The HSD systems and methods disclosed herein have a number of advantages over prior art HSD systems and methods. Because of the simplified data collection and processing, the HSD system can be portable and can be configured as a hand-held device. Further, the system user has the flexibility to rapidly and easily scan any portion or sub-portion of a scene that they want to analyze at their discretion, in real-time. Because of the context feedback provided by context image 100, the user has the ability to make immediate adjustments to the spatial scan parameters on-the-fly during a scan.

By eliminating the need to generate a complete spectral scan for every pixel in the 2D context image 100, by spectrally scanning only a very narrow portion of the 2D context image and by seeking only a good spectral match to stored spectral signature(s), the acquisition speed, analysis, and presentation of context-sensitive information occurs in real-time (>15 frames per second).

Because context image 100 provides the spatial context information of scene 12 being analyzed, it is not necessary to have equally high spatial resolution for spectral image 110. This allows for larger pixels to be used for sensor 46 of imaging spectrometer 40, with a corresponding improvement in the signal-to-noise ratio and decrease in hardware costs, thereby making HSD system 10 more sensitive in the spectral domain and more cost effective.

Figures 7A, 7B, 7C:
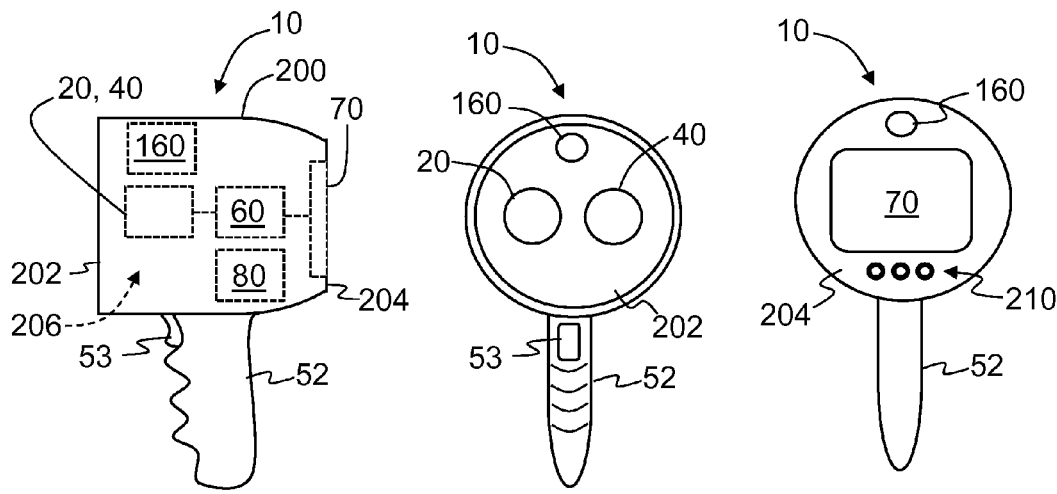
FIGS. 7A through 7C are side, front and back views of an example hand-held hyperspectral detection system.

FIGS. 7A through 7C show a side view, a front-on view and a back view, respectively, of an example hand-held HSD system 10. The hand-held HSD system 10 includes a housing 200 having a front end 202, a back end 204, and a handle 52 attached to the housing. The housing 200 includes an interior 206 configured to contain the main elements of HSD system 10 as described above. The context camera 20 and imaging spectrometer 40 optically communicate through housing front end 202. In addition, optional illumination source 160 also communicates through housing front end 202. The housing back end 204 includes display 70 as well as various buttons 210 that provide input to HSD system 10, turn the system on and off, direct/rotate context camera 20 and imaging spectrometer 40, etc. The handle 52 allows a user to hold HSD system 10 and point it at scene 12 while conveniently viewing fused image 114 on display 70.

Figure 8A:
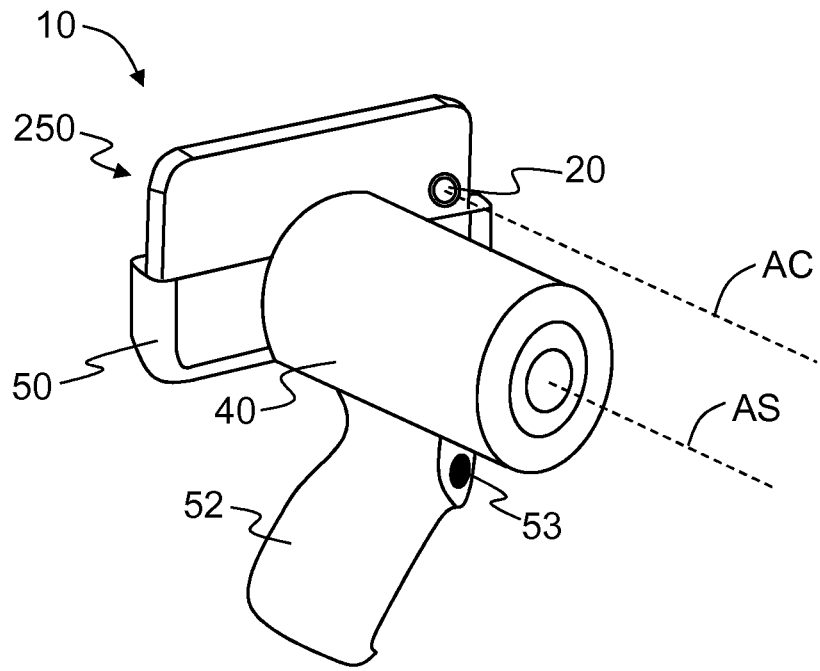
FIGS. 8A and 8B are front-elevated and back-elevated views, respectively, of an example handheld hyperspectral detection system that employs a smart phone.
Figure 8B:
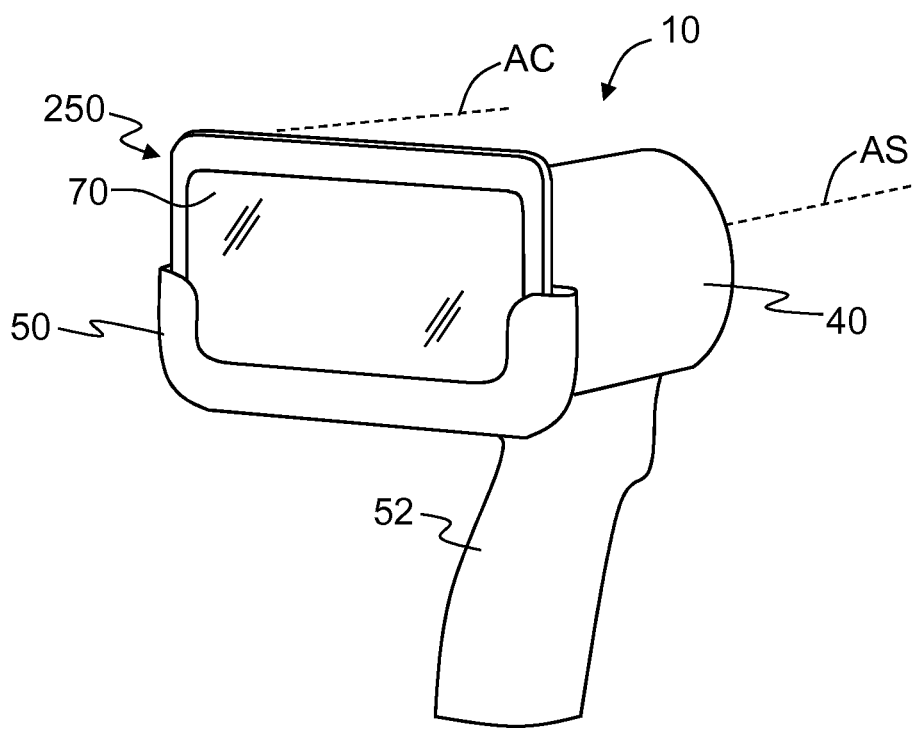

FIGS. 8A and 8B are front-elevated and rear-elevated views, respectively, of another example hand-held HSD system 10. The hand-held HSD system 10 utilizes a smart phone 250 whose digital camera serves as context camera 20 and whose display serves as display 70. The smart phone 250 is supported by support member 50, which is attached to the back end of imaging spectrometer 40 supported by handle 52. FIGS. 8A and 8B show a context-camera optical axis AC and an imaging-spectrometer optical axis AS. In an example, computing components (not shown) of smart phone 250 are used as computer 60.

Figure 9:
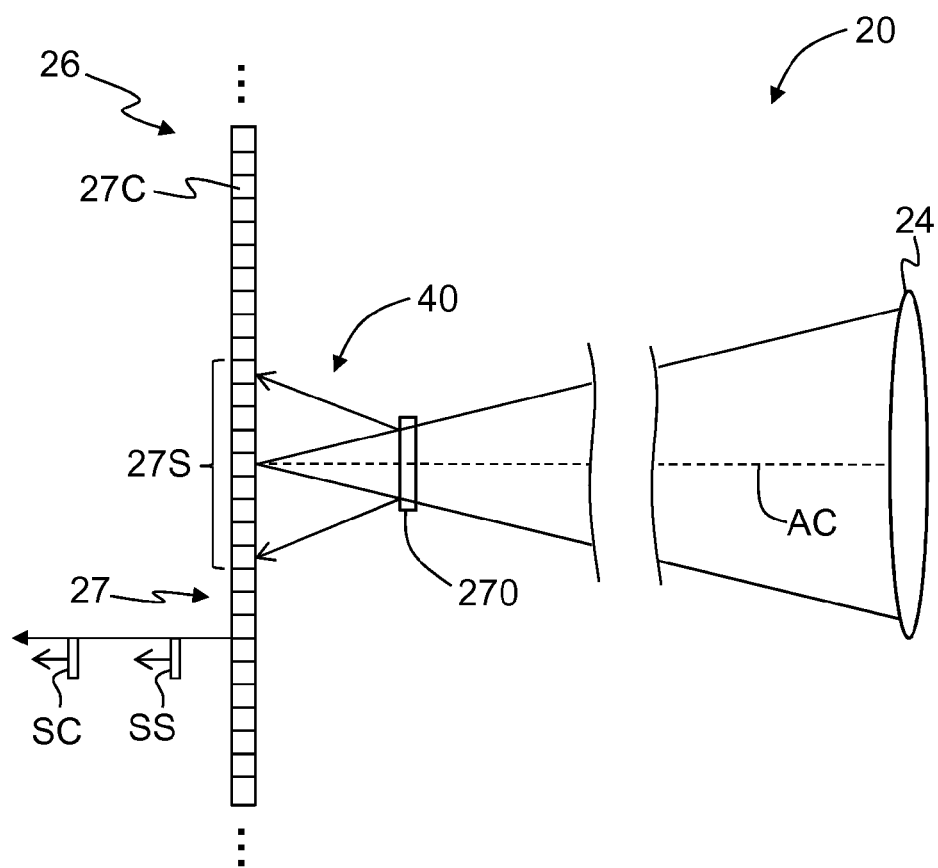
FIG. 9 is a close-up view of an example context camera that includes a spectrally dispersive element that allows the context camera to also serve as the imaging spectrometer.

FIG. 9 is a close-up view of context camera 20 illustrating an embodiment wherein context-camera image sensor 26, which is made up of pixels 27, can also collect spectral data, thereby eliminating the need for a separate imaging spectrometer. In the embodiment of FIG. 9, context camera 20 includes a spectrally dispersive element 270 adjacent to image sensor 26. The spectrally dispersive element 270 serves to disperse light 280 from scene 12 over a range of pixels 27S and is used to define the spectral data, while the remaining pixels 27C are used for context camera 20 in the usual fashion. The context-camera image 100 will be missing context data from those pixels 27S used to capture spectral data. Thus, in the embodiment of FIG. 9, context camera 20 includes a built-in imaging spectrometer 40.

It will be apparent to those skilled in the art that various modifications to the preferred embodiments of the disclosure as described herein can be made without departing from the spirit or scope of the disclosure as defined in the appended claims. Thus, the disclosure covers the modifications and variations, provided they come within the scope of the appended claims and the equivalents thereto.

What is claimed is:

1. A method of performing hyperspectral detection of a scene using a hyperspectral detection system that includes a context camera and an imaging spectrometer each operably connected to a processor, comprising:
    using the context camera, capturing a digital context image of at least a portion of the scene over a field of regard (FoR);
    using the imaging spectrometer, capturing a spectral image of a portion of the scene over an instantaneous field of view (iFoV) that falls within the FoR, and wherein the iFoV is less than half of the FoR;
    using the processor, fusing the context image and the spectral image to form a fused image;
    using the fused image, panning the spectral image over the scene and within the FoR of the context image to capture one or more spectral signatures within the scene; and
    comparing the one or more spectral signatures to one or more reference spectral signatures and marking one or more locations of the one or more spectral signatures within the context image.

2. The method of claim 1, further comprising panning the context image and the spectral image of the fused image over the scene.

3. The method of claim 2, wherein the panning of the context image and the spectral image is performed in synchrony.

4. The method of claim 1, wherein the spectral image has a width $W'_S$ and is captured by an spectral image sensor having pixels with a pixel width $W_{47}$, wherein the context image has a width $W'_R$, and wherein $W_{47}/W'_R \leq [W'_S/W'_R] < 0.25$.

5. The method of claim 4, wherein $W_{47}/W'_R \leq [W_S/W_R] < 0.1$.

6. The method of claim 1, further comprising displaying on a display in real-time the fused image and the one or more marked locations.

7. The method of claim 1, wherein the context image and the spectral image are captured on a common sensor.

8. The method of claim 1, wherein the context image and the spectral image are captured using separate lenses and separate sensors.

9. The method of claim 1, wherein the context image and the spectral image are captured using a common lens.

10. A method of performing hyperspectral detection of a scene using a hyperspectral detection system that includes a context camera and an imaging spectrometer each operably connected to a processor, comprising:
    using the context camera, capturing a digital context image of at least a portion of the scene over a field of regard (FoR);
    using the imaging spectrometer, capturing a spectral image of the scene over an instantaneous field of view (iFoV) with a single column of pixels of a first sensor, wherein the iFoV falls within the FoR;
    receiving the digital context image and the spectral image at the processor and fusing the context image and the spectral image using the processor to form a fused image;
    using the fused image, panning the spectral image over the scene to capture one or more spectral signatures within the scene;
    marking one or more locations of the one or more spectral signatures within the context image by comparing the one or more spectral signatures to one or more reference spectral signatures; and
    displaying on a display in real-time the fused image and the one or more marked locations within the context image.

11. The method of claim 10, further including panning the spectral image and the context image of the fused image in synchrony over the scene.

12. The method of claim 10, wherein the context camera and the imaging spectrometer share a common lens so that the spectral image and the digital context image are each captured by the first sensor using the common lens.

13. The method of claim 10, wherein the digital context image is captured using a smartphone camera.

14. A hyperspectral detection system for spectrally analyzing a scene, comprising:
    a context camera operably arranged to capture a digital context image of at least a portion of the scene over a field of regard (FoR);
    an imaging spectrometer operably arranged to capture a spectral image of the scene over an instantaneous field of view (iFoV) that falls within the FoR, and wherein the IFoV is less than half of the FoR;

means for panning the spectral image over the scene and within the FoR to capture one or more spectral signatures within the scene; and a processor that receives and fuses the context image and the spectral image to form a fused image and that is configured to compare the one or more spectral signatures to one or more reference spectral signatures and to mark one or more locations of the one or more spectral signatures within the context image.

15. The hyperspectral detection system of claim 14, further comprising a display, and wherein the processor is further adapted to display on the display in real-time the fused image and the one or more marked locations.

16. The hyperspectral detection system of claim 14, wherein the context camera and the imaging spectrometer are rotatably supported on a support member that is also rotatable.

17. The hyperspectral detection system of claim 14, further comprising an image sensor that is shared by the context camera and the imaging spectrometer, and further including a spectrally dispersive element arranged adjacent the image sensor.

18. The hyperspectral detection system of claim 14, wherein the context camera includes a first image sensor operably connected to the processor and that forms the digital context image and wherein the imaging spectrometer includes a second image sensor operably connected to the processor and that forms the spectral image.

19. The hyperspectral detection system of claim 14, wherein the context camera and the imaging spectrometer are supported by a support member sized to be hand-held.

20. The hyperspectral detection system of claim 14, wherein the context camera comprises a smart-phone camera.

* * * * *